May 20, 1952
J. E. THOLL
2,597,405
COMBINED BEARING AND STABILIZING MECHANISM
FOR CENTRIFUGAL SEPARATORS
Filed Sept. 28, 1946
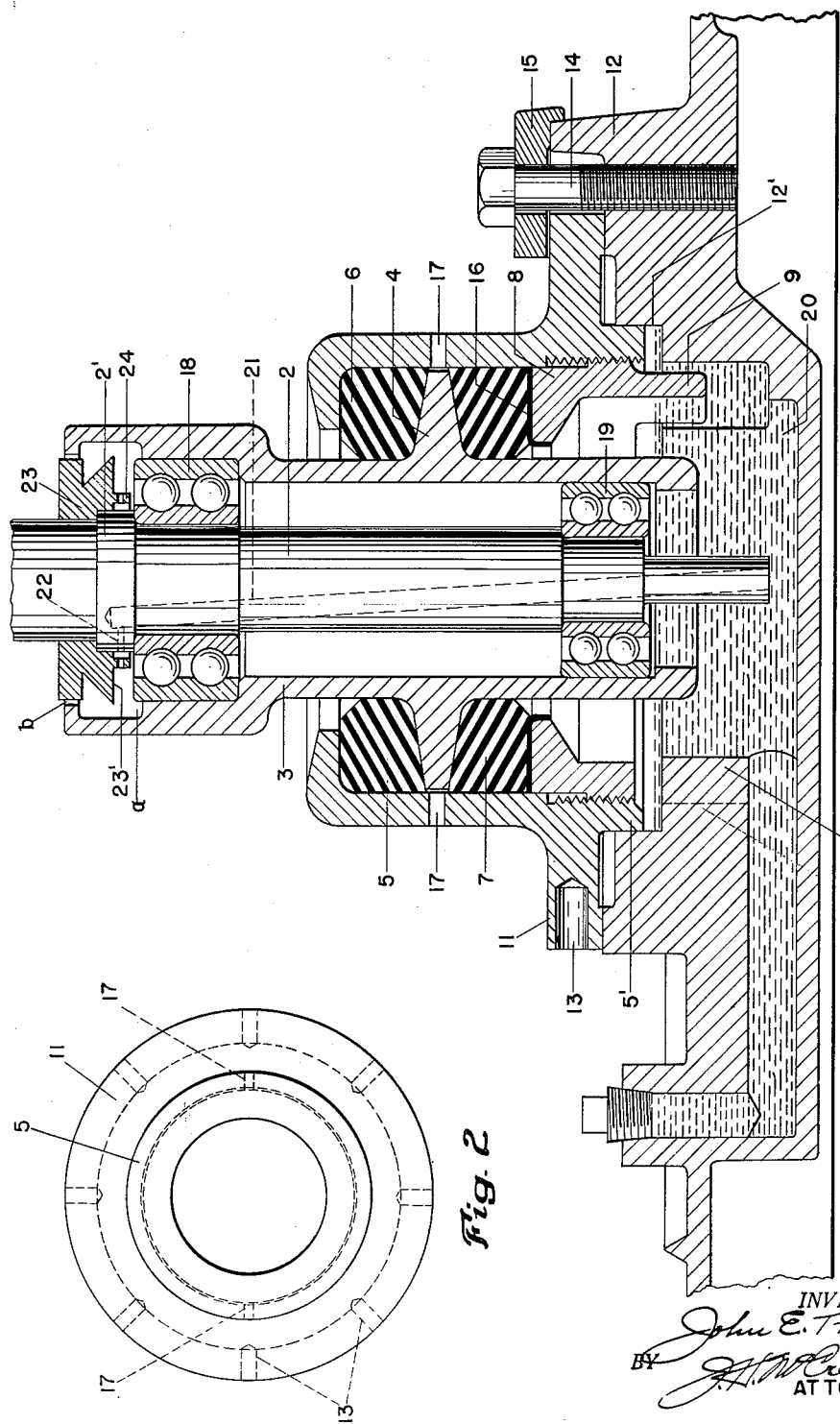

Patented May 20, 1952

2,597,405

UNITED STATES PATENT OFFICE 2,597,405

COMBINED BEARING AND STABILIZING MECHANISM FOR CENTRIFUGAL SEPARATORS

John E. Tholl, Needham, Mass., assignor to American Tool & Machine Co., Boston, Mass., a corporation of Massachusetts Application September 28, 1946, Serial No. 700,005

3 Claims. (Cl. 308—168)

This invention relates to centrifugal extractors, and will be herein disclosed as embodied in a machine of the type much used to extract the oil from metal chips, although it is contemplated that it may also be used in extractors of other types.

In these machines the basket is mounted on the upper end of a shaft or spindle which is supported solely by a bearing structure which is positioned below the basket and is secured to the machine base. There is considerable tendency for machines of this type to vibrate badly, when first started up, or as they slow down, due to the fact that the load which the basket carries usually is sufficiently unbalanced to produce this action at certain speeds. In an earlier Patent No. 1,966,420, assigned to the assignee of the present invention, a combined stabilizing and bearing structure is described and claimed which has proved very satisfactory in reducing the vibration arising from the cause just described.

The present invention aims further to improve the construction shown in said patent, both with a view to reducing the time and labor involved in adjusting the stabilizing pressure, and also to provide a bearing structure and an automatic lubricating mechanism for it, which will reduce the power required to operate the machine; will provide smoother running conditions; and will reduce the rate of wear and depreciation.

The nature of the invention will be readily understood from the following description when read in connection with the accompanying drawing, and the novel features will be particularly pointed out in the appended claims.

In the drawing,

Fig. 1 is a vertical, sectional view of those parts of a centrifugal extractor with which this invention is more especially concerned and illustrates a construction embodying this invention; and Fig. 2 is a plan view of the housing.

Referring first to Fig. 1, the construction there shown comprises an upright spindle 2 mounted in a bearing structure which includes a quill 3 provided with a circumferential flange 4 extending radially from approximately its midsection. This part of the quill, and the cushioning members 6 and 7, are enclosed in a housing 5 with the flange 4 positioned between these members and the lower cushioning unit 7 resting on a tubular nut 8 which is threaded into the lower part of the housing. Extending radially from the lower part of the housing 5 is an annular flange 11 which rests on a seat formed on the machine base 12 to receive it. A tubular extension 5' also is provided on the lower end of the housing 5 to fit snugly within a cylindrical socket formed in the base 12, and this part of the bearing structure is so organized that the axis of the socket coincides with the axis of the spindle and the parts are definitely maintained in this relationship. Projecting downwardly from the unit 8 are one or more fingers 9 which extend into the same horizontal plane with a lug 10 formed on the base. Consequently, when the housing 5 is rotated about the vertical axis of the spindle, the nut will revolve with it until it strikes one side or the other of the lug 10, at which time further rotation of the housing will result in threading the nut 8 up or down in the housing, while the latter remains stationary. Whether the nut is moved up or down depends upon the direction of rotation of the housing, so that, in this manner, the pressure with which the cushioning members 6 and 7 grip the flange 4 can be adjusted to the desired value.

In making the adjustment just described, rotative movement of the housing 5 is easily produced by inserting a rod in one of the several holes 13 drilled radially into the flange 11. When the desired degree of adjustment has been made, the housing is clamped to the base by tightening each of the bolts 14 down on to its respective lug 15, through which it passes, and which bears on both the upper margin of the flange 11 and also on the adjacent portion of the base 12. Usually three or four of these bolts are provided.

With this arrangement, therefore, it is merely necessary to loosen the bolts 14 in order to release the housing 5, after which its adjustment may be quickly made, as just described, and the housing may then be clamped in its adjusting position by simply turning up the bolts. Preferably, four holes 17 are drilled through the housing 5 where they line up approximately with the flange 4 and act as vents for the escape of any air which may be trapped between the cushioning members.

There is some tendency for the lower cushioning member 7 to stick rather firmly to the upper surface of the nut 8. Accordingly, I prefer to interpose between these parts a sheet metal washer 16, which may stick to the part 7, but will not adhere to the nut. This washer is provided with a short, central, tubular flange, which fits into the upper end of the cavity in the nut 8 and centers the washer relatively to the nut.

The spindle bearing mechanism provided by this invention includes upper and lower bearings of the ball, roller, or other antifriction type, indicated, respectively, at 18 and 19, and at least one of these bearings is constructed to support the spindle, both vertically and radially. In the construction shown, the outer race of the bearing 18 rests on an internal shoulder provided in the quill 3, while a shoulder at the bottom of the enlargement or collar section 2' of the spindle rests on the inner race, this bearing, therefore, taking the vertical thrust of the spindle and the load which it carries.

In order to lubricate both sets of bearings with oil taken from the well 20 in the base 12, an oil duct 21 is drilled diagonally from the bottom of the spindle up through to a point just above the upper bearing 18. At this point a small lateral hole 22 conducts the oil from the duct 21 to the peripheral surface of the spindle and discharges it. Because the lower end of the spindle is submerged in oil which naturally rises for a substantial distance in the duct, the centrifugal force created in this part of the duct, when the spindle starts up, is sufficient to initiate an upward flow of the oil, due to centrifugal action, and as the spindle speed increases, oil is forced up through the entire length of both ducts 21 and 22. Also, the lower end of the spindle preferably is reduced in radius to a dimension practically as small as required for this construction, so as to minimize the tendency of this part of the spindle to force oil away from the intake end of the duct 21, simply by centrifugal action.

Mounted fast on the spindle, immediately above the ball bearing 18, is a collar 23 provided with a downwardly extending flange 24 encircling, and slightly spaced from, the external surface of the spindle which it surrounds, and several small holes are drilled through this flange in the plane of revolution of the duct 22. Consequently, when the spindle is running, the oil discharged from said duct is forced violently against the internal surface of the flange, part of it passing through the holes in said flange and thus creating an oil vapor or mist in the chamber $a$. Immediately above the level of these holes the collar is extended radially to provide a horizontal annular surface projecting more than half-way across the space between the flange 24 and the inner surface of the surrounding quill. This flat surface cooperates with the very small clearance at $b$, between the collar and the quill, to confine this vapor and to exert a pressure on it tending to force it down in to the upper ball bearing 18. Below this bearing the vapor condenses or precipitates and supplies lubricant to the lower ball bearing.

This arrangement has been found in actual practice to operate very satisfactorily, providing ample lubrication for the ball bearings, without material waste of oil, and requiring practically no attention other than to keep the oil well filled to a suitable level.

The cushioning members 6 and 7 may be made of such materials as natural or synthetic rubber, or some of the rubbery thermoplastic compositions. The vulcanized compounds made from natural rubber have proved satisfactory when they could be protected from oil and when this, for any reason, has been difficult, then the more elastic of the synthetic rubber compounds have given good service.

While I have herein shown and described a preferred embodiment of my invention, it is contemplated that the invention may be embodied in other forms without departing from the spirit or scope thereof.

Having thus described my invention, what I desire to claim as new is:

1. In a centrifugal extractor, the combination with an upright spindle for supporting the centrifugal basket, a bearing structure supporting said spindle and comprising a quill having an oil dispersion chamber formed at the upper end thereof, a base supporting said bearing structure and having an oil well therein, the bearing structure including upper and lower antifriction bearings mounted in said quill, said upper antifriction bearing occurring at a point immediately below the oil dispersion chamber, said spindle having an oil duct therein, the lower end of said duct being submerged in the oil in said well while the upper end of the duct leads to a lateral discharge port positioned to deliver oil from the spindle into the oil dispersion chamber, said duct being inclined relatively to the axis of said spindle substantially from the lower end thereof to approximately said discharge port so that rotation of the spindle will create a centrifugal force in the oil in said duct serving to force said oil upwardly through the duct and said port, and restricted aperture means interposed in the path of movement of oil ejected from the spindle, said means cooperating with the dispersion chamber for converting the oil into a mist.

2. In a centrifugal extractor according to preceding claim 1, a construction in which the lower end portion of said spindle submerged in the oil in said well is of a diameter much smaller than that at the discharge port of the spindle above said upper bearing.

3. A structure as defined in claim 1, in which the restricted aperture means includes a collar fast on said spindle and having a flange portion extending downwardly into the path of movement of oil as it leaves the discharge port, said flange being formed with openings which are located in close proximity to the discharge port.

JOHN E. THOLL.

REFERENCES CITED

The following references are of record in the file of this patent:

UNITED STATES PATENTS

| Number | Name | Date |
| --- | --- | --- |
| 1,630,712 | Meder | May 31, 1927 |
| 1,966,420 | Tholl | July 10, 1934 |
| 2,062,920 | Mapes | Dec. 1, 1936 |

FOREIGN PATENTS

| Number | Country | Date |
| --- | --- | --- |
| 73,776 | Germany | Apr. 2, 1894 |
| 311,308 | Germany | May 13, 1916 |
| 324,542 | Germany | Sept. 1, 1920 |